US012226041B2

(12) United States Patent
Tang et al.

(10) Patent No.: US 12,226,041 B2
(45) Date of Patent: Feb. 18, 2025

(54) LOW-TEMPERATURE COOKING MACHINE

(71) Applicant: Foshan Shunde Midea Electrical Heating Appliances Manufacturing Co., Ltd., Foshan (CN)

(72) Inventors: Wenwang Tang, Foshan (CN); Yong Yang, Foshan (CN); Jong Oh Lee, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 767 days.

(21) Appl. No.: 17/446,699

(22) Filed: Sep. 1, 2021

(65) Prior Publication Data

US 2021/0393068 A1 Dec. 23, 2021

Related U.S. Application Data

(63) Continuation of application No. PCT/CN2019/096013, filed on Jul. 15, 2019.

(30) Foreign Application Priority Data

Apr. 3, 2019 (CN) .......................... 201910266928.7

(51) Int. Cl.
A47J 27/10 (2006.01)
A47J 36/24 (2006.01)
A47J 36/32 (2006.01)

(52) U.S. Cl.
CPC ........... *A47J 27/10* (2013.01); *A47J 36/2494* (2013.01); *A47J 36/32* (2013.01)

(58) Field of Classification Search
CPC ........ A47J 27/10; A47J 27/18; A47J 36/2494; A47J 36/32; A47J 36/24
See application file for complete search history.

(56) References Cited

U.S. PATENT DOCUMENTS 8,288,692 B2* 10/2012 Liang .................. A61F 7/02
392/339
2013/0240500 A1* 9/2013 Alipour ................ A47J 27/004
220/573.1
2013/0284031 A1 10/2013 Braukmann

FOREIGN PATENT DOCUMENTS

CN 105919444 A 9/2016
CN 109152396 A 1/2019
(Continued)

OTHER PUBLICATIONS

Extended European Search Report, EP19922879.2, Apr. 28, 2022, 8 pgs.
(Continued)

*Primary Examiner* — Dana Ross
*Assistant Examiner* — Adam M Eckardt
(74) *Attorney, Agent, or Firm* — Morgan, Lewis & Bockius LLP

(57) ABSTRACT

Disclosed in the present invention is a low-temperature cooking machine. The low-temperature cooking machine comprises a flexible heating unit and a pump, and the pump is used for providing pressure or suction to cause the flexible heating unit to deform and contact and heat food. The low-temperature cooking machine in the present invention is a novel cooking device; under the action of the pump, the flexible heating unit as a heater can be deformed and directly contact food, so as to directly heat and cook the food. The low-temperature cooking machine in the present invention is a novel device and can replace an existing low-temperature cooking device having a constant temperature water bath and a vacuum plastic package machine.

17 Claims, 3 Drawing Sheets

(56) References Cited

FOREIGN PATENT DOCUMENTS

| | | |
|---|---|---|
| CN | 109463997 A | 3/2019 |
| EP | 2615953 B1 | 1/2015 |
| EP | 2816939 B1 | 10/2017 |
| KR | 20130091814 A | 8/2013 |
| WO | WO 2017197482 A1 | 11/2017 |

OTHER PUBLICATIONS

Tencent Technology, ISRWO, PCT/CN2019/096013, Dec. 20, 2019, 6 pgs.
Tencent Technology, IPRP, PCT/CN2019/096013, Sep. 28, 2021, 5 pgs.
Midea Group Co., Ltd., Third Chinese Office Action, CN Patent Application No. 201910266928.7, Jul. 18, 2022, 7 pgs.
Midea Group Co., Ltd., European Office Action, EP Patent Application No. 19922879.2, Feb. 15, 2024, 5 pgs.

\* cited by examiner

LOW-TEMPERATURE COOKING MACHINE

CROSS REFERENCE TO RELATED APPLICATIONS

This application is a continuation of PCT International Application No. PCT/CN2019/096013, filed Jul. 15, 2019, which claims the benefits of the Chinese Patent Application No. 201910266928.7 filed on Apr. 3, 2019, with China National Intellectual Property Administration, and entitled "Low-Temperature Cooking Machine," the entire content of which is incorporated herein by reference.

FIELD

The present invention relates to the field of electric cooking apparatuses, in particular to a low-temperature cooking machine.

BACKGROUND

The existing low-temperature cooking machines usually employ two products or have two separate products at the same time: a thermostat water bath (the temperature is usually set between 20° C. and 99° C.) and a vacuum plastic package machine. The vacuum low-temperature cooking method is to pack the food densely by vacuum pumping or using a preservative film first, and then put the food into a stirring thermostat water bath and cooks the food at about 65° C. low temperature; in addition, the cooking temperature and duration may be different for different foods. The method can preserve the original flavor of the food, the fragrance of the spices and the primary color of the food to the greatest extent; besides, the cooking method is healthier, and is favored by more and more consumers.

SUMMARY

The object of the present invention is to provide a low-temperature cooking machine that can be operated more simply and has a higher product integration level.

To attain the above-mentioned object, the present invention provides a low-temperature cooking machine, which includes a flexible heating unit and a pump for providing pressure or suction to cause the flexible heating unit to deform and contact with and heat food.

In some embodiments, the low-temperature cooking machine includes a food cooking cavity for receiving the food, and the flexible heating unit at least partially surrounds the food cooking cavity;

wherein the food cooking cavity is a closed chamber, the pump is an air pump for vacuuming the food cooking cavity, and the flexible heating unit is in close contact with and heats the food under vacuum suction.

In some embodiments, the flexible heating unit is arranged around the food cooking cavity, or the flexible heating unit is at least arranged at two sides of the food.

In some embodiments, the flexible heating unit is a liquid heating bag connected with a water heater.

In some embodiments, the low-temperature cooking machine includes a base and an upper cover pivotally mounted on the base, wherein the flexible heating unit is arranged in a base cavity of the base, and the food cooking cavity is formed in the base cavity;

wherein the food is able to be put into the food cooking cavity when the upper cover is pivotally opened, and the upper cover encloses the food cooking cavity when the upper cover is pivotally closed.

In some embodiments, the flexible heating unit is arranged on the inner side of the upper cover.

In some embodiments, the low-temperature cooking machine includes a flexible medium storage unit connected with a medium pipe, wherein the pump is a pressurizing pump for pumping a pressurized medium toward the flexible medium storage unit through the medium pipe, and the flexible heating unit is pushed by the boosted pressure of the flexible medium storage unit to closely contact with and heat the food.

In some embodiments, the low-temperature cooking machine includes a base, wherein the flexible heating unit, the flexible medium storage unit and the food cooking cavity for receiving the food are arranged in a base cavity of the base, the flexible heating unit is at least partially surrounds the food cooking cavity, and the flexible medium storage unit is able to at least partially contact with the flexible heating unit.

In some embodiments, the flexible heating unit is a liquid heating bag connected with a water heater, and the flexible medium storage unit is a medium storage bag.

In some embodiments, the base cavity is divided by the flexible heating unit into the food cooking cavity and a medium storage area serving as the flexible medium storage unit.

In some embodiments, the flexible heating unit includes an upper flexible heating unit and a lower flexible heating unit, the low-temperature cooking machine includes an upper cover pivotally mounted on the base, the upper flexible heating unit is arranged in an upper cover cavity of the upper cover, and the upper cover cavity is divided by the upper flexible heating unit into an upper medium storage area and an upper food cooking cavity; the base cavity is divided by the lower flexible heating unit into a lower food cooking cavity and a lower medium storage area;

wherein the lower food cooking cavity, the lower flexible heating unit and the lower medium storage area are sequentially arranged in a separated manner from top to bottom in the base cavity; the upper medium storage area, the upper flexible heating unit and the upper food cooking cavity are sequentially arranged in a separated manner from top to bottom in the upper cover cavity.

In some embodiments, the low-temperature cooking machine includes an upper cover pivotally mounted on the base, wherein the medium storage area, the flexible heating unit and the food cooking cavity are transversely and sequentially arranged in a separated manner in the base cavity, and the upper cover covers the base to enclose the medium storage area.

In some embodiments, the food cooking cavity is an enclosed chamber provided with an exhaust air passage.

In some embodiments, a non-return exhaust valve is arranged in the exhaust air passage.

In some embodiments, the flexible heating unit is a liquid heating bag connected with a water heater.

In some embodiments, the medium pipe is an air intake passage, and the pump is an air pump that blows air to the flexible medium storage unit through the air intake passage.

In some embodiments, the low-temperature cooking machine includes an air pump controller for monitoring the air content in the food cooking cavity.

In some embodiments, the low-temperature cooking machine includes a heating controller for monitoring the heating temperature of the flexible heating unit.

In some embodiments, the flexible heating unit includes a thermostatically controlled heating unit.

In some embodiments, the cooking temperature of the low-temperature cooking machine is 60~80° C.

The low-temperature cooking machine in the present invention is a novel cooking apparatus, in which, under the action of the pump, the flexible heating unit that serves as a heater can be deformed and directly contact with the food, thereby directly heats and cook the food; under the joint action of the pump and the flexible heating unit, the food can be placed in a vacuum food cooking cavity and heated directly by the flexible heating unit. Thus, the low-temperature cooking machine in the present invention is a novel integrated apparatus and can replace an existing low-temperature cooking apparatus having a thermostat water bath and a vacuum plastic package machine.

Other features and advantages of the present invention will be further detailed in the embodiments hereunder.

BRIEF DESCRIPTION OF THE DRAWINGS

The accompanying drawings are provided here to facilitate further understanding on the present invention and constitute a part of this document. They are used in conjunction with the following embodiments to explain the present invention but shall not be comprehended as constituting any limitation to the present invention. In the figures.

Figure 1A:
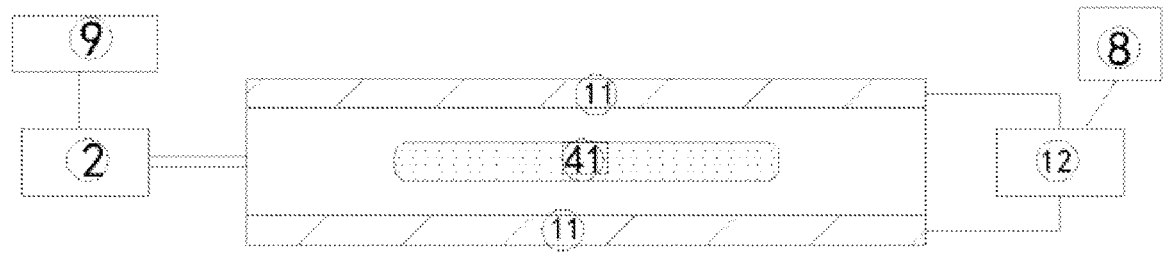
FIGS. 1a and 1b are schematic structural diagrams of the low-temperature cooking machine according to first embodiments of the present invention, illustrating a change process in which the flexible heating unit is deformed under the suction provided by the pump and thereby contacts with and heat the food, wherein the illustrated flexible heating unit partially surrounds the food cooking cavity.
Figure 1B:
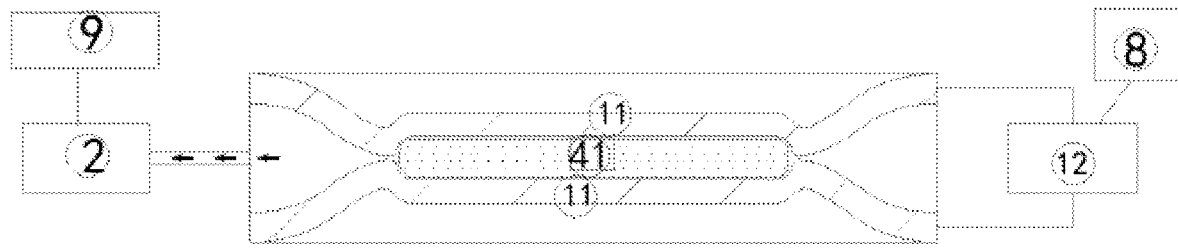
Figure 2A:
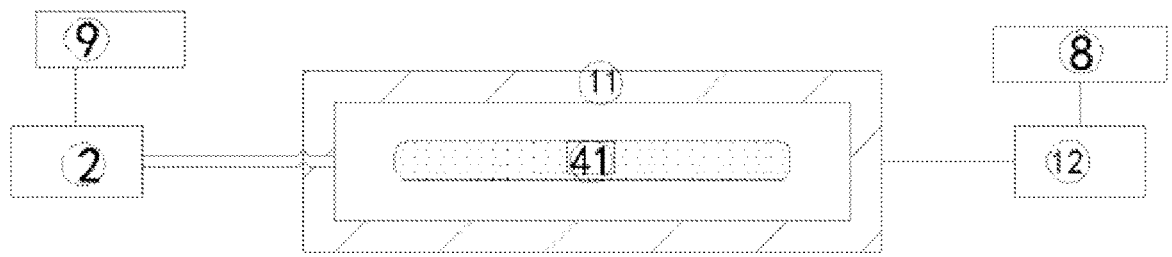
FIGS. 2a and 2b are schematic structural diagrams of the low-temperature cooking machine according to second embodiments of the present invention, illustrating a change process in which the flexible heating unit is deformed under the suction provided by the pump and thereby contacts with and heat the food, wherein the illustrated flexible heating unit is arranged around the food cooking cavity.
Figure 2B:
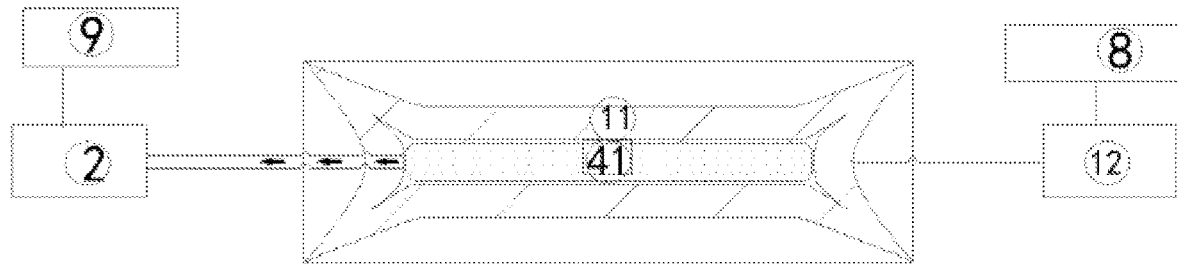
Figure 3A:
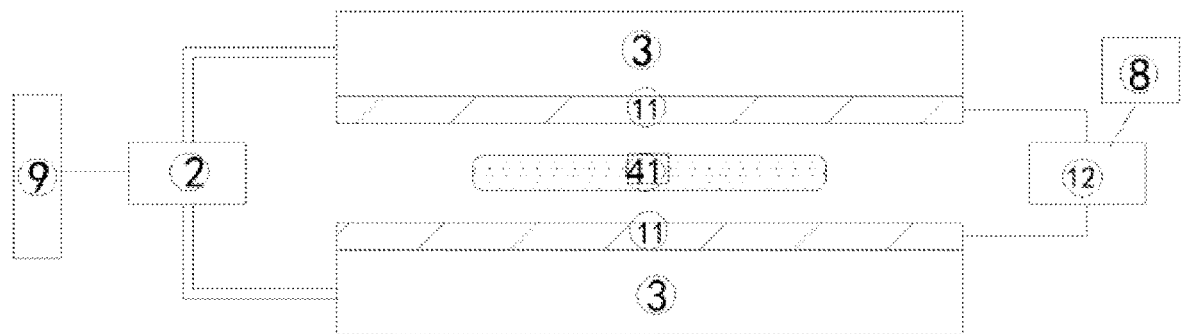
FIGS. 3a and 3b are schematic structural diagrams of the low-temperature cooking machine according to third embodiments of the present invention, illustrating a change process in which the flexible heating unit is deformed under the pressure provided by the pump and thereby contacts with and heat the food, wherein the illustrated flexible heating unit partially surrounds the food cooking cavity.
Figure 3B:
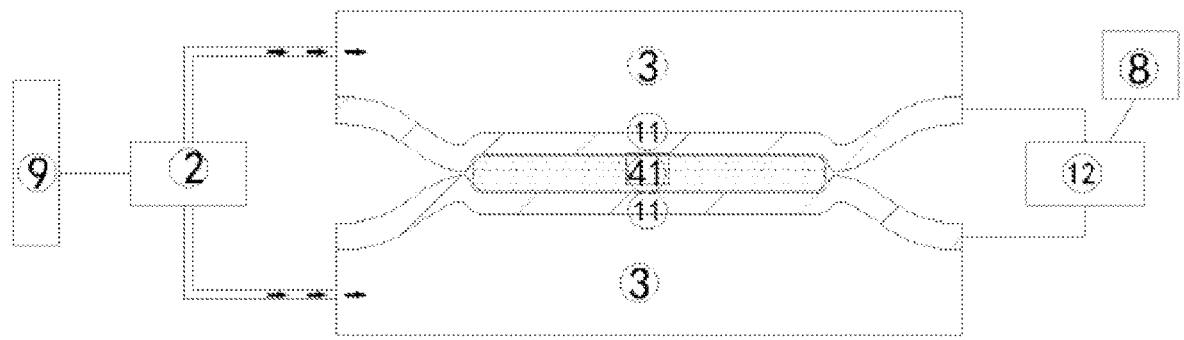
Figure 4A:
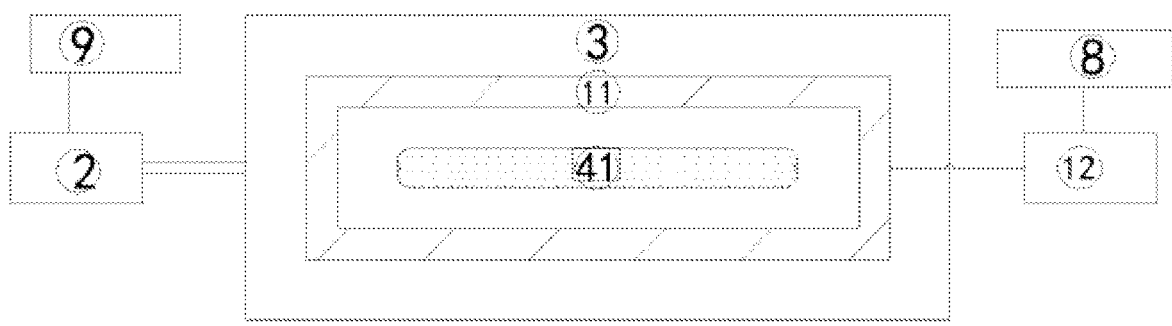
FIGS. 4a and 4b are schematic structural diagrams of the low-temperature cooking machine according to fourth embodiments of the present invention, illustrating a change process in which the flexible heating unit is deformed under the pressure provided by the pump and thereby contacts with and heat the food, wherein the illustrated flexible heating unit is arranged around the food cooking cavity.
Figure 4B:
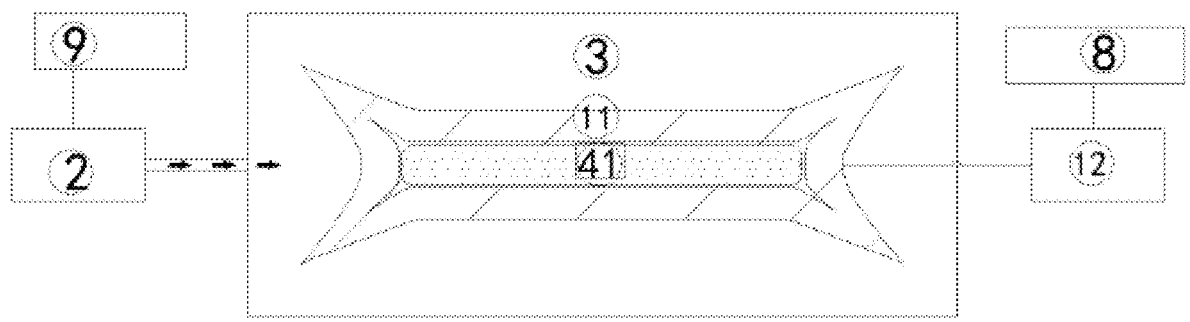

REFERENCE NUMBERS:

| | | | |
|---|---|---|---|
| 1 | flexible heating unit | 2 | pump |
| 3 | flexible medium storage unit | 4 | food cooking cavity |
| 5 | base | 6 | upper cover |
| 8 | heating controller | 41 | food |
| 9 | air pump controller | 10 | pivot shaft |
| 11 | liquid heating bag | 12 | water heater |
| 13 | upper flexible heating unit | 14 | lower flexible heating unit |
| 31 | upper media storage area | 32 | lower media storage area |
| 42 | upper food cooking cavity | 43 | lower food cooking cavity |

DETAILED DESCRIPTION

Hereunder some embodiments of the present invention will be detailed with reference to the accompanying drawings. It should be understood that the embodiments described herein are only provided to describe and explain the present invention rather than constitute any limitation to the present invention.

In the present disclosure, unless otherwise specified, the words that denote directions or orientations, such as "above", "below", "top", and "bottom", etc., are usually used to describe the relative position relations among the components with respect to the direction shown in the accompanying drawings or the vertical, plumb, or gravity direction.

To solve the problem that the existing low-temperature cooking machines requires two products cooperating with each other (a thermostat water bath and a vacuum plastic package machine) and involve several operating procedures such as vacuum plastic packaging and water injection, etc. to realize food cooking, the present invention provides a novel low-temperature cooking machine, as shown in FIGS. 1a-2b. The low-temperature cooking machine includes a flexible heating unit 1 (usually including a liquid heating bag 11 and a water heater 12, or see FIG. 6) and a pump 2 for providing pressure or suction to cause the flexible heating unit 1 to deform and contact with and heat food 41.

Apparently, the low-temperature cooking machine in the present invention is a novel cooking apparatus, in which, under the action of the pump 2, the flexible heating unit 1 that serves as a heater can be deformed and directly contact with food 41, so as to directly heat and cook the food 41.

In the low-temperature cooking machine provided by the present invention, as shown in FIGS. 1a-2b, the low-temperature cooking machine includes a food cooking cavity 4 for receiving the food 41, wherein the flexible heating unit 1 at least partially surrounds the food cooking cavity 4; wherein the food cooking cavity 4 is a closed chamber, the pump 2 is an air pump for vacuuming the food cooking cavity 4, and the flexible heating unit 1 is in close contact with and heats the food 41 under vacuum suction. Therefore, this technical scheme mainly employs air suction from the food cooking cavity 4; specifically, the user may directly put the food 41 into the food cooking cavity 4, and the pump 2 pumps air out of the food cooking cavity 4, so that the flexible heating unit 1 is deformed under the suction and thereby closely contact with the food 41, thus the food 41 is in a vacuum-tight cooking environment and the flexible heating unit 1 that serves as a heater heats and cooks the food 41. By vacuuming the food cooking cavity 4 with the pump 2, a vacuumed cooking state can be established between the food 41 and the flexible heating unit 1 that serves as a heater, so as to replace a vacuum plastic package machine and avoid the use of a vacuum preservative bag. Besides, the flexible heating unit 1 may be a heating unit that requires replacing and replenishing a flexible heating material in time or may be a reusable heating unit. In the case that the flexible heating unit 1 is a reusable heating unit, both the operation step of adding water (for water bath) in time and the operation step of bagging and vacuuming in the existing low-temperature cooking machines can be omitted, thus the operation steps of cooking can be simplified. Apparently, with this technical scheme, the low-temperature cooking machine in the present invention is a novel apparatus and can replace the existing low-temperature cooking apparatus having a thermostat water bath and a vacuum plastic package machine.

To enable the flexible heating unit 1 to contact with and heat the food 41, the flexible heating unit 1 may partially contact with the food 41 or surround the food 41, so as to heat the food. In this technical scheme, optionally the flexible heating unit 1 is arranged around the food cooking cavity 4 (see FIG. 5), or the flexible heating unit 1 is at least arranged at two sides of the food 41 (see FIG. 5), or the flexible heating unit 1 may be arranged at one side of the food 41.

In view that water has high fluidity and can be heated quickly, optionally the flexible heating unit 1 is a liquid heating bag 11 connected with a water heater 12, the liquid heating bag 11 may be a flexible bag filled with water, and the water heater 12 is connected with the flexible bag or arranged in the flexible bag. Of course, alternatively the flexible heating unit 1 may be made of a flexible material connected other heating devices; for example, the flexible heating unit 1 may include a deformable flexible material such as silicone.

Specifically, the low-temperature cooking machine includes a base 5 and an upper cover 6 pivotally mounted on the base 5, wherein the flexible heating unit 1 is arranged in a base cavity of the base 5, and the food cooking cavity 4 is formed in the base cavity; wherein the food 41 may be put into the food cooking cavity 4 when the upper cover 6 is pivotally opened, and the upper cover 6 encloses the food cooking cavity 4 when the upper cover 6 is pivotally closed. That is to say, when the upper cover 6 is pivotally opened around a pivot shaft (see the pivot shaft 10 in FIGS. 5 and 6), the closed food cooking cavity 4 is opened at the same time, thereby the food 41 can be placed into the food cooking cavity 4; after the upper cover 6 is pivotally closed on the base 5, the food cooking cavity 4 becomes an enclosed chamber, so that the food 41 in the food cooking cavity 4 can be vacuum-pumped with the pump 2 that serves as a suction pump.

Although it is a common practice to place the food cooking cavity 4 in the base cavity of the base 5, in the low-temperature cooking machine in the present invention, the flexible heating unit 1 may also be arranged on the inner side of the upper cover 6, the food cooking cavity 4 may be arranged in the base cavity or in the upper cover cavity, or may be arranged in the base cavity and the upper cover cavity; in addition, the food cooking cavity 4 may be surrounded by the flexible heating unit 1 in the upper cover 5 and the base 5, thereby the food 41 can be fully wrapped by the flexible heating unit 1 that serves as a heater, so as to achieve a better cooking effect of the food 41.

In some embodiments of low-temperature cooking machine in the present invention as shown in FIGS. 3a-4b, the low-temperature cooking machine includes a flexible medium storage unit 3 connected with a medium pipe, wherein the pump body 2 is a pressurizing pump for pumping a pressurized medium toward the flexible medium storage unit 3 through the medium pipe, and the flexible heating unit 1 is pushed by the boosted pressure of the flexible medium storage unit 3 to closely contact with and heat the food 41. It can be seen that the force for deforming the flexible heating unit 1 of the low-temperature cooking machine in this technical scheme mainly comes from the pressurization on the flexible medium storage unit 3 carried out by the pump 2 that serves as a pressurizing pump, and the flexible heating unit 1 is squeezed by the flexible medium storage unit 3 and thereby is deformed, so that the flexible heating unit 1 closely attaches to the food 41 to be heated, and a vacuum-attached cooking effect is achieved between the flexible heating unit 1 and the food 41. Likewise, it can be seen that the low-temperature cooking machine in this technical scheme is a novel apparatus and can replace an existing low-temperature cooking apparatus having a thermostat water bath and a vacuum plastic package machine.

Figure 5:
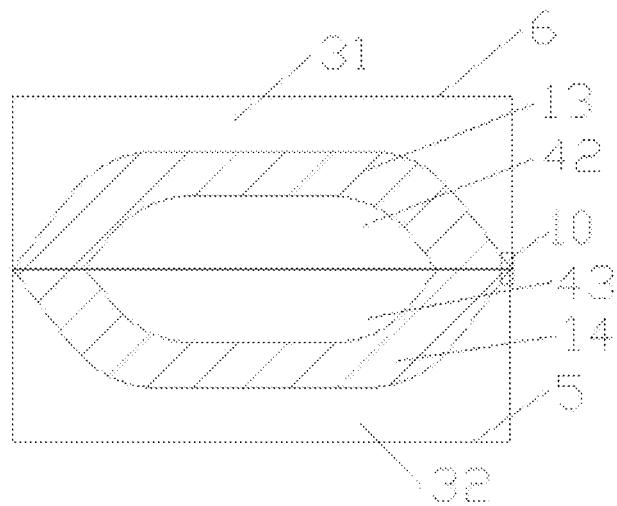
FIG. 5 shows a schematic structural diagram of the low-temperature cooking machine according to the fourth embodiments of the present invention.
Figure 6:
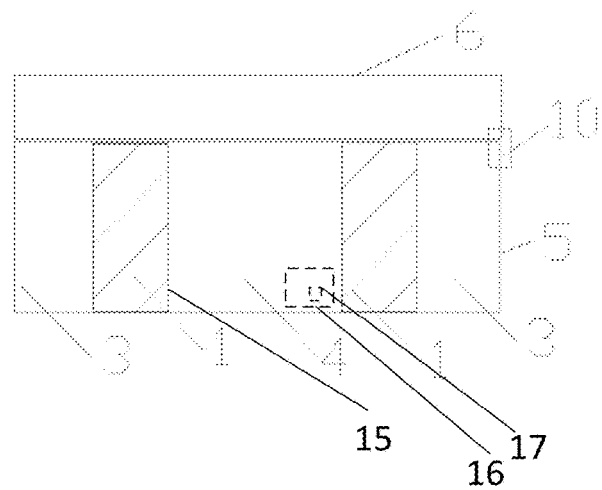
FIG. 6 shows another schematic structural diagram of the low-temperature cooking machine according to the fourth embodiments of the present invention.

As shown in FIGS. 5 and 6, to enable the flexible medium storage unit 3 to squeeze and deform the flexible heating unit 1, the low-temperature cooking machine includes a base 5, wherein the flexible heating unit 1, the flexible medium storage unit 3, and the food cooking cavity 4 for receiving the food 41 are arranged in a base cavity 15 of the base 5, the flexible heating unit 1 at least partially surrounds the food cooking cavity 4, and the flexible medium storage unit 3 can at least partially contact with the flexible heating unit 1, so that the flexible medium storage unit 3 can drive the flexible heating unit 1 to move and deform it. Likewise, the flexible heating unit 1 may be a liquid heating bag 11 connected with a water heater 12. The flexible medium storage unit 3 may include a medium storage bag; usually, the flexible medium storage unit 3 may exist in the form of a self-sealing bag, thereby it is unnecessary to consider the problem of self-sealing of the bag in the process of pressurization on the flexible medium storage unit 3 carried out by the pump 2; in addition, the flexible bag of the flexible medium storage unit 3 may be made of various materials. The medium storage bag may be an air storage bag, which is to say, the medium may be gas, such as air; the flexible heating unit 1 is squeezed by external pressurization of the medium storage bag to deform so as to expel the air between the food cooking cavity 4 and the food 41.

It is common practice to arrange the food cooking cavity 4 mainly in the base cavity. To that end, the base cavity is divided by the flexible heating unit 1 into a food cooking cavity 4 and a medium storage area that serves as the flexible medium storage unit 3. That is to say, the flexible medium storage unit 3 exists in the form of a partitioned chamber, as shown in FIGS. 5 and 6, and the base cavity is partitioned.

In the low-temperature cooking machine in the present invention, in order to cook the food 41 more uniformly and effectively, in some embodiments shown in FIG. 5, the flexible heating unit 1 includes an upper flexible heating unit 13 and a lower flexible heating unit 14, and the low-temperature cooking machine includes a upper cover 6 pivotally mounted on the base 5, the upper flexible heating unit 13 is arranged in an upper cover cavity of the upper cover 6, and the upper cover cavity is divided by the upper flexible heating unit 13 into an upper medium storage area 31 and an upper food cooking cavity 42; the base cavity is divided by the lower flexible heating unit 14 into a lower food cooking cavity 43 and a lower medium storage area 32; wherein the lower food cooking cavity 43, the lower flexible heating unit 14 and the lower medium storage area 32 are sequentially arranged in a separated manner from top to bottom in the base cavity; the upper medium storage area 31, the upper flexible heating unit 13 and the upper food cooking cavity 42 are sequentially arranged in a separated manner from top to bottom in the upper cover cavity. Therefore, the food 41 can be placed in the food cooking cavity 4 composed of the upper food cooking cavity 42 and the lower food cooking cavity 43, and the food cooking cavity 4 is a chamber enclosed by the upper flexible heating unit 13 and the lower flexible heating unit 14, which may be separate parts or may be formed integrally and communicate with each other. Likewise, the upper medium storage area 31 and the lower medium storage area 32 may be separate parts or may be formed integrally and communicate with each other. The medium storage area of the flexible medium storage unit 3 can be sealed; when the medium storage area is pressurized, the medium storage area can drive the flexible heating unit 1 to deform, so that the air in the food cooking cavity 4 is squeezed and expelled, thus a uniform vacuum and heated cooking environment for the food 41 is ensured.

In some embodiments shown in FIG. 6, the low-temperature cooking machine includes an upper cover 6 pivotally mounted on the base 5, wherein the medium storage area, the flexible heating unit 1 and the food cooking cavity 4 are transversely and sequentially arranged in a separated manner in the base cavity, and the upper cover 6 covers the base 5 to enclose the medium storage area.

Optionally, the food cooking cavity 4 is a sealed chamber provided with an exhaust air passage 16, and a non-return exhaust valve 17 is arranged in the exhaust air passage 16, so that the air content in the food cooking cavity 4 can be monitored more easily by controlling the non-return exhaust valve 17 to open or close. Of course, since this technical scheme employs an approach of passive exhausting by pressurizing the food cooking cavity 4, alternatively the food cooking cavity 4 may be an unsealed chamber. In the entire passive exhausting process, the food cooking cavity 4 is squeezed and exhausted, and finally a vacuum cooking environment can be established for the food 41.

In order to make it easier and cheaper to pressurize the flexible medium storage unit 3 with the pump 2 that serves as a pressurizing pump, the flexible medium storage unit 3 may be provided with an air intake passage as the medium pipe, and the pump 2 is an air pump that blows air to the flexible medium storage unit 3 through the air intake passage.

Furthermore, the low-temperature cooking machine in the present invention includes an air pump controller 9 for monitoring the air content in the food cooking cavity 4, so as to achieve a better vacuum cooking effect of the food 41 by detecting the air content in the food cooking cavity 4 timely.

In addition, the low-temperature cooking machine in the present invention may further include a heating controller 8 for monitoring the heating temperature of the flexible heating unit 1. Thus, the heating temperature of the food 41 to be cooked is monitored in real time by detecting the heating temperature of the flexible heating unit 1, thereby a better control effect can be achieved, and the customer satisfaction can be improved.

Furthermore, the flexible heating unit 1 includes a thermostatically controlled heating unit. A low-temperature cooking method employing thermostatically controlled heating can preserve the original flavor of the food, the fragrance of the spices and the primary color of the food to the greatest extent, thereby the user's experience and satisfaction can be improved.

Usually, in the low-temperature cooking machine in the present invention, the cooking temperature of the low-temperature cooking machine may be selected to be 60° C.-80° C., such as 60° C., 62° C., 65° C., 71° C., 78° C., 80° C., etc., and the cooking duration and temperature may be different for different foods and may be adjusted appropriately with the thermostatically controlled heating unit of the low-temperature cooking machine.

Moreover, in order to ensure the hygienic condition of the food 41 in the food cooking cavity 4, the interior of the food cooking cavity 4 may be washed or cleaned in advance before each time of cooking. In addition, other sterilizing devices, such as UV sterilizer, etc., may be arranged in the food cooking cavity 4.

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in above embodiments may be combined in any appropriate form, provided that there is no conflict. To avoid unnecessary repetition, the possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

What is claimed is:

1. A low-temperature cooking machine, comprising:
a flexible heating unit; and
a pump for providing pressure or suction to cause the flexible heating unit to deform and contact with and heat a food;
an upper cover pivotally mounted on a base; and
a food cooking cavity for receiving the food, wherein the flexible heating unit comprises a liquid heating bag connected with a water heater, the flexible heating unit comprises an upper flexible heating unit and a lower flexible heating unit, the upper flexible heating unit is arranged in an upper cover cavity of the upper cover, and the upper cover cavity is divided by the upper flexible heating unit into an upper medium storage area and an upper food cooking cavity; a base cavity of the base is divided by the lower flexible heating unit into a lower food cooking cavity and a lower medium storage area, wherein the lower food cooking cavity, the lower flexible heating unit and the lower medium storage area are sequentially arranged in a separated manner from top to bottom in the base cavity; the upper medium storage area, the upper flexible heating unit and the upper food cooking cavity are sequentially arranged in a separated manner from top to bottom in the upper cover cavity.

2. The low-temperature cooking machine according to claim 1, wherein the flexible heating unit at least partially surrounds the food cooking cavity,
wherein the food cooking cavity is a closed chamber, the pump is an air pump for vacuuming the food cooking cavity, and the flexible heating unit is in close contact with and heats the food under vacuum suction.

3. The low-temperature cooking machine according to claim 2, wherein the flexible heating unit is arranged around the food cooking cavity, or the flexible heating unit is at least arranged at two sides of the food.

4. The low-temperature cooking machine according to claim 2, further comprising the base wherein the flexible heating unit is arranged in the base cavity of the base, and the food cooking cavity is formed in the base cavity; wherein the food is able to be put into the food cooking cavity when the upper cover is pivotally opened, and the upper cover encloses the food cooking cavity when the upper cover is pivotally closed.

5. The low-temperature cooking machine according to claim 4, wherein the flexible heating unit is arranged on an inner side of the upper cover.

6. The low-temperature cooking machine according to claim 1, further comprising a flexible medium storage unit connected with a medium pipe, wherein the pump is a pressurizing pump for pumping a pressurized medium toward the flexible medium storage unit through the medium pipe, and the flexible heating unit is pushed by a boosted pressure of the flexible medium storage unit to closely contact with and heat the food.

7. The low-temperature cooking machine according to claim 6, further comprising the base, wherein the flexible heating unit, the flexible medium storage unit and the food cooking cavity for receiving the food are arranged in the base cavity of the base, the flexible heating unit at least partially surrounds the food cooking cavity, and the flexible medium storage unit is able to at least partially contact with the flexible heating unit.

8. The low-temperature cooking machine according to claim 7, wherein the flexible medium storage unit comprises a medium storage bag.

9. The low-temperature cooking machine according to claim 7, wherein the base cavity is divided by the flexible heating unit into the food cooking cavity and a medium storage area serving as the flexible medium storage unit.

10. The low-temperature cooking machine according to claim 9, wherein the medium storage area, the flexible heating unit and the food cooking cavity are transversely and sequentially arranged in a separated manner in the base cavity, and the upper cover covers the base to enclose the medium storage area.

11. The low-temperature cooking machine according to claim 6, wherein the food cooking cavity is an enclosed chamber provided with an exhaust passage.

12. The low-temperature cooking machine according to claim 11, wherein a non-return exhaust valve is arranged in the exhaust passage.

13. The low-temperature cooking machine according to claim 12, wherein the medium pipe is an air intake passage, and the pump is an air pump that blows air to the flexible medium storage unit through the air intake passage.

14. The low-temperature cooking machine according to claim 1, further comprising an air pump controller for monitoring an amount of air in the food cooking cavity.

15. The low-temperature cooking machine according to claim 1, further comprising a heating controller for monitoring a heating temperature of the flexible heating unit.

16. The low-temperature cooking machine according to claim 15, wherein the flexible heating unit comprises a thermostatically controlled heating unit.

17. The low-temperature cooking machine according to claim 1, wherein a cooking temperature of the low-temperature cooking machine is 60-80° C.

* * * * *